(12) United States Patent
Chang et al.

(10) Patent No.: US 11,646,402 B2
(45) Date of Patent: May 9, 2023

(54) METHOD FOR ELECTROCHEMICAL PRETREATMENT OF VANADIUM POSITIVE ELECTRODE FOR LITHIUM SECONDARY BATTERIES AND VANADIUM POSITIVE ELECTRODE FOR LITHIUM SECONDARY BATTERIES PRETREATED THEREBY

(71) Applicant: LG CHEM, LTD., Seoul (KR)

(72) Inventors: Wansoo Chang, Daejeon (KR); Jonghyun Chae, Daejeon (KR); Suhwan Kim, Daejeon (KR); Sung Chul Lim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 284 days.

(21) Appl. No.: 16/769,154

(22) PCT Filed: Jun. 25, 2019

(86) PCT No.: PCT/KR2019/007661
§ 371 (c)(1),
(2) Date: Jun. 2, 2020

(87) PCT Pub. No.: WO2020/017774
PCT Pub. Date: Jan. 23, 2020

(65) Prior Publication Data
US 2021/0218010 A1    Jul. 15, 2021

(30) Foreign Application Priority Data

Jul. 18, 2018  (KR) .................. 10-2018-0083267

(51) Int. Cl.
*H01M 4/04* (2006.01)
*H01M 4/48* (2010.01)
(Continued)

(52) U.S. Cl.
CPC ......... *H01M 4/0459* (2013.01); *H01M 4/483* (2013.01); *H01M 10/0525* (2013.01); *H01M 2004/028* (2013.01)

(58) Field of Classification Search
CPC .............. H01M 4/0459; H01M 4/483; H01M 10/0525; H01M 2004/028
See application file for complete search history.

(56) References Cited

U.S. PATENT DOCUMENTS 5,219,677 A * 6/1993 Labat .................. H01M 10/052
429/50
2013/0244115 A1  9/2013 Cao et al.
(Continued)

FOREIGN PATENT DOCUMENTS

CN  102637871 A  8/2012
CN  103403925 A  11/2013
(Continued)

OTHER PUBLICATIONS

Cheah, Yan. L., et al. Journal of The Electrochemical Society, 160 (8) A1016-A1024 (2013) (Year: 2013).*
(Continued)

*Primary Examiner* — Sarah A. Slifka
*Assistant Examiner* — Emily Elizabeth Freeman
(74) *Attorney, Agent, or Firm* — Birch, Stewart, Kolasch & Birch, LLP

(57) ABSTRACT

An electrochemical pretreatment method of a vanadium positive electrode for a lithium secondary battery, which can improve the lifetime characteristics of the positive electrode and the battery by inhibiting the leaching of vanadium when charging and discharging the lithium secondary battery using, for instance, vanadium oxide ($V_2O_5$) as a positive electrode, and a vanadium positive electrode for a lithium secondary battery pretreated thereby. The electrochemical
(Continued)

(a) Examples 1 and 2

(b) Comparative Example 1

(c) Comparative Examples 2 and 3 pretreatment method of the vanadium positive electrode for a lithium secondary battery includes a) a step of discharging the lithium free vanadium positive electrode at a voltage of 1.9 V or more; b) an electrochemical pretreatment step of maintaining the discharged vanadium positive electrode of a) at an onset potential value or a potential value having a maximum current through a potentiostat; and c) a step of charging and discharging the pretreated vanadium positive electrode of b) at a voltage range of 2.1V to 4.0V.

5 Claims, 3 Drawing Sheets

(51) Int. Cl.
  *H01M 10/0525* (2010.01)
  *H01M 4/02* (2006.01)

(56) References Cited

U.S. PATENT DOCUMENTS

| | | | |
|---|---|---|---|
| 2015/0280232 | A1 | 10/2015 | Cao et al. |
| 2015/0380732 | A1 | 12/2015 | Xie |
| 2018/0351202 | A1* | 12/2018 | Choi ................ H01M 10/0525 |
| 2019/0190022 | A1 | 6/2019 | Kim et al. |

FOREIGN PATENT DOCUMENTS

| | | | |
|---|---|---|---|
| CN | 104466102 | A | 3/2015 |
| CN | 106904653 | A | 6/2017 |
| CN | 108110244 | A | 6/2018 |
| JP | 1-137563 | A | 5/1989 |
| JP | 4-253160 | A | 9/1992 |
| JP | 4-357667 | A | 12/1992 |
| JP | 4-363874 | A | 12/1992 |
| JP | 2004-10445 | A | 1/2004 |
| JP | 2019-515460 | A | 6/2019 |
| KR | 10-2010-0013513 | A | 2/2010 |
| KR | 10-2014-0039536 | A | 4/2014 |
| KR | 10-2017-0120310 | A | 10/2017 |
| KR | 10-2017-0120314 | A | 10/2017 |
| KR | 10-2018-0049811 | A | 5/2018 |

OTHER PUBLICATIONS

Armer et al., "Phase change effect on the structural and electrochemical behaviour of pure and doped vanadium pentoxide as positive electrodes for lithium ion batteries," Journal of Power Sources, vol. 353, 2017, pp. 40-50.

International Search Report (PCT/ISA/210) issued in PCT/KR2019/007661, dated Oct. 1, 2019.

Mai et al., "Improved cycling stability of nanostructured electrode materials enabled by prelithiation," Journal of Materials Research, vol. 25, No. 8, Aug. 2010, pp. 1413-1420.

McNulty et al., "Synthesis and electrochemical properties of vanadium oxide materials and structures as Li-ion battery positive electrodes," Journal of Power Sources, vol. 267, 2014, pp. 831-873.

Delmas, C., et al, "The LixV2O5 system: An overview of the structure modifications induced by the lithium intercalation," Solid State Ionics, Aug. 1, 1994, vol. 69, No. 3-4, pp. 257-264.

European Search Report for Appl. No. 19838350.7 dated Feb. 17, 2021.

Potiron, E., et al, "Electrochemically synthesized vanadium oxides as lithium insertion hosts," Electrochimica Acta, Sep. 30, 1999, vol. 45, No. 1-2, pp. 197-214.

Ng et al., "Flame Spray-Pyrolyzed Vanadium Oxide Nanopariicles for Lithium Battery Cathodes", Physical Chemistry Chemical Physics, vol. 11, No. 19, 2009, pp. 3748-3755.

* cited by examiner

METHOD FOR ELECTROCHEMICAL PRETREATMENT OF VANADIUM POSITIVE ELECTRODE FOR LITHIUM SECONDARY BATTERIES AND VANADIUM POSITIVE ELECTRODE FOR LITHIUM SECONDARY BATTERIES PRETREATED THEREBY

TECHNICAL FIELD

The present application claims the benefit of priority based on Korean Patent Application No. 10-2018-0083267 filed on Jul. 18, 2018, all the contents of which are incorporated herein by reference.

The present invention relates to a positive electrode for a lithium secondary battery, more specifically, to an electrochemical pretreatment method of a vanadium positive electrode for a lithium secondary battery, which can improve the lifetime characteristics of the positive electrode and the battery by inhibiting the leaching of vanadium when charging/discharging the lithium secondary battery using vanadium oxide ($V_2O_5$) as a positive electrode, and to a vanadium positive electrode for a lithium secondary battery pretreated thereby.

BACKGROUND ART

As the technology for mobile devices is developed and the demand therefor is increasing, the demand for secondary batteries as energy sources is rapidly increasing. Recently, the use of a secondary battery as a power source for an electric vehicle (EV) and a hybrid electric vehicle (HEV) has been realized. Therefore, much research has been done on secondary batteries which can meet various demands, and in particular, since there is a high demand for lithium secondary batteries with high energy density, discharging voltage and output stability, research on this is actively being carried out.

The technology of the lithium secondary battery has recently been applied in various fields through remarkable development, but currently, a variety of batteries are being researched to overcome the limitation of the lithium secondary battery from the viewpoints of the capacity, safety, output, enlargement, and miniaturization of the battery. Representatively, metal-air batteries which have a large theoretical capacity compared to lithium secondary batteries in terms of capacity, all-solid-state batteries with no risk of explosion in terms of safety, supercapacitors which are superior in output characteristics to lithium secondary batteries in terms of output, sodium-sulfur (Na—S) batteries or redox flow batteries (RFB) in terms of enlargement, thin film batteries in terms of miniaturization, etc., are continuously studied in academia and industry.

In general, the lithium secondary battery uses a metal oxide such as $LiCoO_2$ as a positive electrode active material and a carbon material as a negative electrode active material, and is prepared by inserting a polyolefin-based porous separator between a negative electrode and a positive electrode and impregnating a nonaqueous electrolyte solution having a lithium salt such as $LiPF_6$. However, $LiCoO_2$ has the advantage of high operating voltage and large capacity, but has various problems in that it is relatively expensive due to the limited amount of resources, has a low charging/discharging current amount, has an unstable crystal structure at a voltage higher than a certain voltage, reacts with the electrolyte solution and thus has a risk of ignition and so on. Moreover, $LiCoO_2$ has a disadvantage in that it exhibits a very large change in physical properties even when some parameters are changed on the manufacturing process.

One of the alternatives to this $LiCoO_2$ is $LiMn_2O_4$. $LiMn_2O_4$ has lower capacity than $LiCoO_2$ but has the advantage that it is inexpensive and has no pollution factors. Considering the structures of $LiCoO_2$ and $LiMn_2O_4$, which are typical examples of a positive electrode active material, $LiCoO_2$ has a layered structure and $LiMn_2O_4$ has a spinel structure. These two materials commonly have excellent performance as a battery when the crystallinity is excellent. Therefore, in order to crystallize the two materials in manufacturing a thin film battery, a heat treatment process must be carried out either in the process of forming a thin film or as a post-process. Therefore, the manufacture of a battery using these two materials on the polymer material such as plastic for medical or special purposes is impossible up to now because the polymer material cannot withstand the heat treatment temperature.

Vanadium oxide ($V_2O_5$) has been proposed to solve the disadvantages of these materials. Vanadium oxide has low capacity, but has the advantage of having excellent electrode characteristics even in the amorphous state. In addition, in the case of vanadium oxide, synthesis is relatively easy as compared to the two materials, and particularly, it is attracting much attention because it can be synthesized at room temperature. In the case of amorphous vanadium oxide synthesized at room temperature, it has superior performance (e.g., lifetime or efficiency) rather than crystalline vanadium oxide. Therefore, if vanadium oxide is used as a positive electrode active material, a room temperature process becomes feasible, and thus it becomes possible to manufacture a secondary battery on a polymer material such as plastic.

In addition, the vanadium oxide with layered structure, unlike positive electrodes of different materials with layered structure, has the advantage of storing several lithium (Li) inside the structure, and thus it is very likely to be applied widely as a positive electrode active material of a lithium secondary battery in the future. However, if the lithium secondary battery using vanadium oxide as a positive electrode is discharged at 2.0 V or less, the vanadium oxide is converted to a stable halite state or rock-salt phase (ω phase) as compared to the case where lithium metal is applied as a positive electrode, which makes it difficult to perform reversible lithium intercalation/de-intercalation, and thus causes a problem that it fails to function as the positive electrode of the lithium secondary battery or lithium ion battery. Also, in the case of vanadium oxide, vanadium is leached during the charging/discharging process, which also acts as a factor to lower the lifetime characteristic of the battery. Therefore, in the related art, research and development are actively carried out to improve the lifetime characteristics of the positive electrode and the battery by applying vanadium oxide as a positive electrode active material of lithium secondary battery, but blocking the leaching of vanadium.

DISCLOSURE

Technical Problem

Therefore, it is an object of the invention to provide an electrochemical pretreatment method of a vanadium positive electrode for a lithium secondary battery, which can improve the lifetime characteristics of the positive electrode and the battery by inhibiting the leaching of vanadium when charging/discharging the lithium secondary battery using vanadium oxide (V$_2$O$_5$) as a positive electrode, and a vanadium positive electrode for a lithium secondary battery pretreated thereby.

Technical Solution

In order to achieve the above objects, the present invention provides an electrochemical pretreatment method of a vanadium positive electrode for a lithium secondary battery comprising: a) a step of discharging the lithium free vanadium positive electrode at a voltage of 1.9 V or more; b) an electrochemical pretreatment step of maintaining the discharged vanadium positive electrode at an onset potential value or a potential value having a maximum current through a potentiostat; and c) a step of charging/discharging the pretreated vanadium positive electrode at a voltage range of 2.1 to 4.0V.

In addition, the present invention provides a vanadium positive electrode for a lithium secondary battery whose surface is in a stable irreversible state and whose inside is in a reversible state.

Advantageous Effects

According to the electrochemical pretreatment method of the vanadium positive electrode for the lithium secondary battery according to the present invention and the vanadium positive electrode for the lithium secondary battery pretreated thereby, the lifetime characteristic of the positive electrode and the battery can be improved by inhibiting the leaching of vanadium when charging/discharging the lithium secondary battery using vanadium oxide (V$_2$O$_5$) as a positive electrode.

BEST MODE

Figure 1:
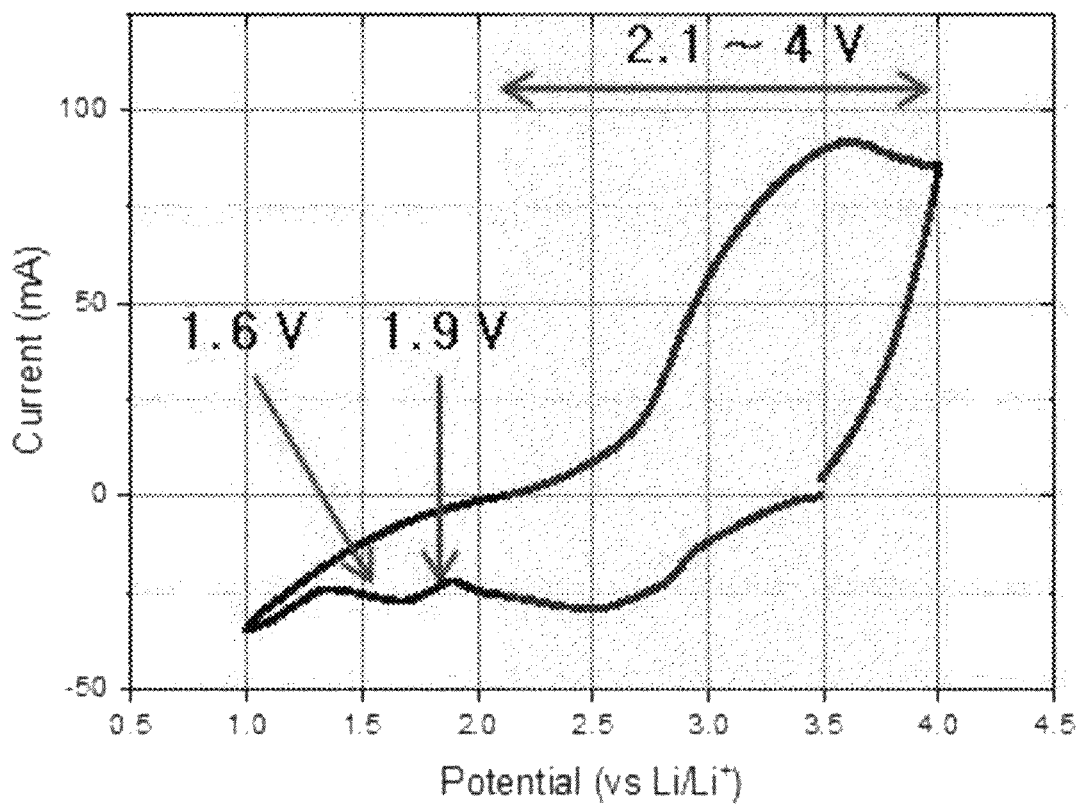
FIG. 1 is a graph showing a shape of a reduction peak that can be confirmed by cyclic voltammetry according to an Example of the present invention.

Hereinafter, the present invention will be described in detail.

The electrochemical pretreatment method of the vanadium positive electrode for the lithium secondary battery according to the present invention comprises a) a step of discharging a lithium free vanadium positive electrode at a voltage of 1.9 V or more, b) an electrochemical pretreatment step of maintaining the discharged vanadium positive electrode of a) at an onset potential value or a potential value having a maximum current through a potentiostat and c) a step of charging and discharging the pretreated vanadium positive electrode of b) at a voltage range of 2.1V to 4.0V.

As described above, the vanadium oxide with layered structure, unlike positive electrodes of different materials with layered structure, has the advantage of storing several lithium (Li) inside the structure, and thus it is very useful as a positive electrode active material of a lithium secondary battery. However, if the lithium secondary battery using vanadium oxide as a positive electrode is discharged at 2.0 V or less, the vanadium oxide is converted to a stable halite state or rock-salt phase (ω phase) as compared to the case where lithium metal is applied as a positive electrode, which makes it difficult to perform reversible lithium intercalation/de-intercalation, and thus causes a problem that it fails to function as the positive electrode of the lithium secondary battery. Also, in the case of vanadium oxide, vanadium is leached during the charging/discharging processes, which also act as a factor to lower the lifetime characteristic of the battery. Therefore, by electrochemically pretreating the vanadium positive electrode as described above, the present applicant has solved the problem that the lifetime characteristic of the positive electrode and the battery is degraded when applying vanadium oxide.

That is, the present invention relates to a technique for preventing the leaching of vanadium, and further improving or enhancing the lifetime characteristic of a vanadium positive electrode and a lithium secondary battery including the same, by using an electrochemical pre-lithiation method using potentiostat unlike the conventional method using the chemical pre-lithiation method, that is, by applying a voltage to the vanadium oxide for a short time to change the vanadium oxide to a stable phase. This suggests a method of efficiently charging/discharging a lithium free positive electrode material, that is, a positive electrode material in a state that does not contain lithium, and has an advantage that it is possible to check the pretreatment (preconditioning) condition through a cyclic voltammetry.

The vanadium used as a positive electrode material for the lithium secondary battery of the present invention may have various oxidation numbers as a transition metal. Therefore, there are vanadium oxides having various ratios of vanadium and oxygen, and thus the kind of the vanadium oxides is not limited in the present invention. However, considering the stability of the structure, the vanadium oxide used in the present invention may be a compound represented by the following formula 1.

$$V_aO_b,$$ [Formula 1]

wherein 1≤a≤6 and 2≤b≤13.

Among these, the vanadium oxide is preferably a compound having an oxidation number of 2 to 5, and for example may be VO$_2$, V$_2$O$_3$, V$_2$O$_5$ or a combination thereof. At this time, when the oxidation number is 2 or 3, the vanadium oxide is basic, and when the oxidation number is 4 or 5, the vanadium oxide is amphoteric. In particular, vanadium pentoxide (V$_2$O$_5$) which has the oxidation number of 5 is most stable, and thus its use is most preferred.

Vanadium pentoxide (V$_2$O$_5$) is a yellow or yellowish red metal oxide, also called vanadic anhydride. Vanadium pentoxide has a melting point of about 690° C. and a specific gravity of about 3.375 (18° C.). Vanadium pentoxide does not dissolve well in water but is dissolved in alkali to form vanadate. In addition, vanadium pentoxide has excellent ion intercalation ability for lithium ions and has a high potential of about 4 V for lithium metal, and thus is used as a positive electrode material for a lithium secondary battery. In addition, vanadium pentoxide is used as an electrode material for a lithium secondary battery with a solid electrolyte and a polymer electrolyte. In particular, the vanadium pentoxide with mesoporous structure has a high surface area due to the porosity, which improves the diffusion rate of the lithium ions, the electric storage capacity, and the electric conductivity. On the other hand, the particle size of the vanadium oxide does not significantly affect the present invention, and thus particles with any particle size can be used without limitation.

Figure 2:
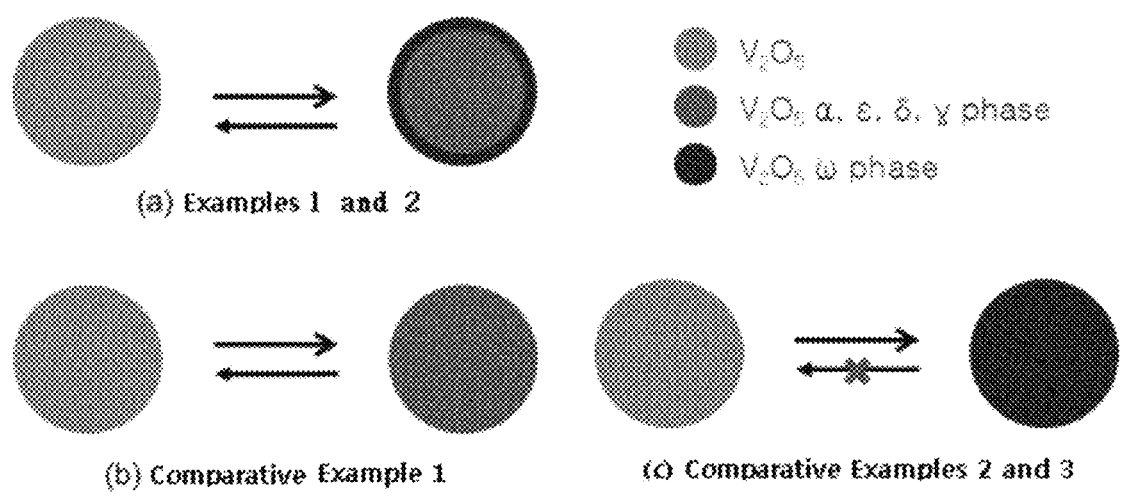
FIG. 2 is a schematic diagram showing phases of the vanadium positive electrodes for the lithium secondary battery charged/discharged in Examples according to the present invention and Comparative Examples.

In order to improve the lifetime characteristics of the vanadium positive electrode and the lithium secondary battery containing the same, the present invention, in which vanadium as described above is applied as a positive electrode material (or a positive electrode active material), first requires that the lithium free vanadium positive electrode (lithium free, i.e. not including lithium inside) be discharged at a voltage of 1.9 V or more, preferably 2.0 to 4.0 V, more preferably 2.1 to 4.0 V (Step a). When the lithium free vanadium positive electrode is discharged at a voltage of less than 1.9 V (preferably, in the case of discharging slowly by charging/discharging apparatus), since the entire vanadium positive electrode is changed into an irreversible ω phase, the vanadium positive electrode discharged below 1.9 V cannot be reversed to reversible phases even by any electrochemical method ((c) in FIG. 2 is a state diagram when discharging at less than 1.9 V, and the above problem can be confirmed through this).

In the case of a lithium secondary battery that uses vanadium as a positive electrode, since the vanadium positive electrode does not contain lithium, lithium enters into the vanadium positive electrode when discharging the battery comprising the vanadium positive electrode, and the vanadium positive electrode undergoes reversible states (α, ε, δ, γ) sequentially during the charging/discharging. After such a reversible state, the vanadium positive electrode turns into the ω phase which is irreversible with regard to the charging/discharging. In other words, in order to go to the irreversible ω phase, it must go through the reversible states, and this requires that the battery comprising the vanadium positive electrode be discharged. Therefore, there is no particular limitation on the time required for discharging the vanadium positive electrode. That is, there is no restriction on the time required for discharging the vanadium positive electrode if the vanadium positive electrode is changed into the irreversible ω phase after passing through all the reversible states (α, ε, δ, γ).

Meanwhile, the voltage at the time of discharging the vanadium positive electrode may vary depending on various onset potential values and potential values having a maximum current through reduction peaks to be described later. For example, when the onset potential value is 1.9 V and the potential value having the maximum current is 1.6 V, the voltage at the time of instantaneously discharging the vanadium positive electrode may be a value exceeding both of the above values, that is, a value exceeding 1.9 V.

Next, after discharging the lithium free vanadium positive electrode, an electrochemical pretreatment (preconditioning) step is carried out to maintain the instantaneous discharged vanadium positive electrode at an onset potential value or a potential value having a maximum current through a potentiostat (Step b).

The term potentiostat refers to an apparatus that allows a difference to be set at a predetermined value regardless of changes in various conditions. The pretreatment is a process of maintaining the discharged vanadium positive electrode for a predetermined time at an onset potential value or a maximum current value using the potentiostat, wherein there is no particular limitation on the time period of its maintenance, but the time period may be set to 5 to 60 seconds, preferably 10 to 50 seconds, more preferably 20 to 40 seconds, considering that only the surface of the vanadium positive electrode is changed to the ω phase, Meanwhile, the onset potential value and the potential value having the maximum current can be obtained by confirming the reduction peak of the lithium secondary battery using vanadium oxide as a positive electrode through cyclic voltammetry (In this case, the negative electrode of the lithium secondary battery may be lithium (metal)).

This is a process of confirming the pretreatment conditions, which can be a sequence of confirming the voltage value that should be maintained during the pretreatment. In other words, by deriving the onset potential value or the potential value having the maximum current through the reduction peak (shown at 2.1 V and below), it becomes possible to confirm the voltage value to be maintained in the above-described pretreatment. Meanwhile, the reduction peak of the battery can be confirmed by performing at a voltage (scan range) of 1.0 to 4.0 V and a scan rate of 1 to 10 mV/s, but the present invention is not limited thereto.

Finally, after performing the electrochemical pretreatment as described above, all processes of the electrochemical pretreatment method of the vanadium positive electrode for the lithium secondary battery according to the present invention are terminated by charging/discharging the pretreatment vanadium positive electrode at a voltage range of 2.1 to 4.0 V (step c). The charging/discharging in step c) above is performed in order to proceed the charging/discharging of the vanadium positive electrode in the reversible states, and it may be performed at a voltage of 2.1 to 4.0 V corresponding to a common normal voltage range. If the charging/discharging is performed at a voltage out of the above range, the entire electrode may change to an irreversible ω phase, and eventually the cell may be degenerated.

If the electrochemical pretreatment method of the vanadium positive electrode for the lithium secondary battery of the present invention is performed as described above, the leaching of the vanadium is blocked and the lifetime characteristic of the battery is improved during the charging/discharging of the lithium secondary battery by forming the vanadium positive electrode structure inherent to the present invention wherein a surface of the vanadium positive electrode is changed into an irreversible omega (ω) phase and becomes irreversible state, and an inside is maintained in the order of reversible alpha (α), epsilon (ε), delta (δ), and gamma (γ) phases (i.e. any one reversible state selected from the group consisting of alpha, epsilon, delta, and gamma phases).

Next, the vanadium positive electrode for a lithium secondary battery pretreated by the electrochemical pretreatment method of the vanadium positive electrode for the lithium secondary battery will be briefly described. The vanadium positive electrode for the lithium secondary battery has the surface of the stable irreversible state and the inside of the reversible state in order to prevent the leaching of vanadium during the charging/discharging of the lithium secondary battery. This is characterized in that it is pretreated by the electrochemical pretreatment method described above. Meanwhile, the description of the vanadium positive electrode or the surface state and internal state of the vanadium positive electrode are the same as those described above.

Meanwhile, except for the vanadium positive electrode material (positive electrode active material) applied in the present invention, the general configuration of the positive electrode, the negative electrode, the electrolyte, and the separator may be conventional ones used in the art, and a detailed description thereof will be given below.

Positive Electrode

The positive electrode comprised in the present invention further comprises a binder, an electrically conductive material and the like in addition to the vanadium positive electrode material as described above. The binder is a component that assists in the bonding between a positive electrode active material and an electrically conductive material and the bonding to a current collector, and for example, may be, but is not limited to, at least one selected from the group consisting of polyvinylidenefluoride (PVdF), polyvinylidenefluoride-polyhexafluoropropylene copolymer (PVdF/HFP), polyvinylacetate, polyvinyl alcohol, polyvinyl ether, polyethylene, polyethyleneoxide, alkylated polyethyleneoxide, polypropylene, polymethyl(meth)acrylate, polyethyl(meth)acrylate, polytetrafluoroethylene (PTFE), polyvinyl chloride, polyacrylonitrile, polyvinylpyridine, polyvinylpyrrolidone, styrene-butadiene rubber, acrylonitrile-butadiene rubber, ethylene-propylene-diene monomer (EPDM) rubber, sulfonated EPDM rubber, styrene-butylene rubber, fluorine rubber, carboxymethylcellulose (CMC), starch, hydroxypropyl cellulose, regenerated cellulose, and mixtures thereof.

The binder is usually added in an amount of 1 to 50 parts by weight, preferably 3 to 15 parts by weight, based on 100 parts by weight of the total weight of the positive electrode. If the content of the binder is less than 1 part by weight, the adhesive strength between the positive electrode active material and the current collector may be insufficient. If the content of the binder is more than 50 parts by weight, the adhesive strength is improved but the content of the positive electrode active material may be reduced, thereby lowering the capacity of the battery.

The electrically conductive material comprised in the positive electrode is not particularly limited as long as it does not cause side reactions in the internal environment of the battery and does not cause chemical changes in the battery but has excellent electrical conductivity. The electrically conductive material may typically be graphite or electrically conductive carbon, and may be, for example, but is not limited to, one selected from the group consisting of graphite such as natural graphite or artificial graphite; carbon black such as carbon black, acetylene black, Ketjen black, Denka black, thermal black, channel black, furnace black and lamp black; carbon-based materials whose crystal structure is graphene or graphite; electrically conductive fibers such as carbon fibers and metal fibers; carbon fluoride; metal powders such as aluminum and nickel powder; electrically conductive whiskers such as zinc oxide and potassium titanate; electrically conductive oxides such as titanium oxide; electrically conductive polymers such as polyphenylene derivatives; and a mixture of two or more thereof.

The electrically conductive material is typically added in an amount of 0.5 to 50 parts by weight, preferably 1 to 30 parts by weight based on 100 parts by weight of total weight of the positive electrode. If the content of electrically conductive material is too low, that is, if it is less than 0.5 parts by weight, it is difficult to obtain an effect on the improvement of the electrical conductivity, or the electrochemical characteristics of the battery may be deteriorated. If the content of the electrically conductive material exceeds 50 parts by weight, that is, if it is too much, the amount of positive electrode active material is relatively small and thus capacity and energy density may be lowered. The method of incorporating the electrically conductive material into the positive electrode is not particularly limited, and conventional methods known in the related art such as coating on the positive electrode active material can be used. Also, if necessary, the addition of the second coating layer with electrical conductivity to the positive electrode active material may replace the addition of the electrically conductive material as described above.

In addition, a filler may be selectively added to the positive electrode of the present invention as a component for inhibiting the expansion of the positive electrode. Such a filler is not particularly limited as long as it can inhibit the expansion of the electrode without causing chemical changes in the battery, and examples thereof may comprise olefinic polymers such as polyethylene and polypropylene; fibrous materials such as glass fibers and carbon fibers.

The positive electrode active material, the binder, the electrically conductive material and the like are dispersed and mixed in a dispersion medium (solvent) to form a slurry, and the slurry can be applied onto the positive electrode current collector, followed by drying and rolling it to prepare a positive electrode of the present invention. The dispersion medium may be, but is not limited to, N-methyl-2-pyrrolidone (NMP), dimethyl formamide (DMF), dimethyl sulfoxide (DMSO), ethanol, isopropanol, water, or a mixture thereof.

The positive electrode current collector may be, but is not limited to platinum (Pt), gold (Au), palladium (Pd), iridium (Ir), silver (Ag), ruthenium (Ru), nickel (Ni), stainless steel (STS), aluminum (Al), molybdenum (Mo), chromium (Cr), carbon (C), titanium (Ti), tungsten (W), ITO (In doped $SnO_2$), FTO (F doped $SnO_2$), or an alloy thereof, or aluminum (Al) or stainless steel whose surface is treated with carbon (C), nickel (Ni), titanium (Ti) or silver (Ag) or so on. The shape of the positive electrode current collector may be in the form of a foil, film, sheet, punched form, porous body, foam or the like.

Negative Electrode

The negative electrode may be manufactured according to a conventional method known in the art. For example, the negative electrode active material, the electrically conductive material, the binder, and if required the filler and the like are dispersed and mixed in a dispersion medium (solvent) to form a slurry, and the slurry can be applied onto the negative electrode current collector, followed by drying and rolling it to prepare a negative electrode. The negative electrode active material may be a lithium metal or a lithium alloy (for example, an alloy of lithium and a metal such as aluminum, zinc, bismuth, cadmium, antimony, silicon, lead, tin, gallium or indium). The negative electrode current collector may be, but is not limited to, platinum (Pt), gold (Au), palladium (Pd), iridium (Ir), silver (Ag), ruthenium (Ru), nickel (Ni), stainless steel (STS), copper (Cu), molybdenum (Mo), chromium (Cr), carbon (C), titanium (Ti), tungsten (W), ITO (In doped $SnO_2$), FTO (F doped $SnO_2$), or an alloy thereof, or copper (Cu) or stainless steel whose surface was treated with carbon (C), nickel (Ni), titanium (Ti) or silver (Ag) or so on. The shape of the negative electrode current collector may be in the form of a foil, film, sheet, punched form, porous body, foam or the like.

Separator

The separator is interposed between the positive electrode and the negative electrode and prevents a short circuit therebetween and serves as a pathway for lithium ions. Olefin-based polymers such as polyethylene and polypropylene, glass fibers or the like may be used in the form of sheets, multilayers, microporous films, woven fabrics, non-woven fabrics or the like as the separator, but the present invention is not limited thereto. Meanwhile, if a solid electrolyte (e.g., an organic solid electrolyte, an inorganic solid electrolyte, etc.) such as a polymer is used as the electrolyte, the solid electrolyte may also serve as a separator. Specifically, an insulating thin film with high ion permeability and mechanical strength is used. The pore diameter of the separator is generally in the range of 0.01 to 10 μm, and the thickness may generally be in the range of 5 to 300 μm.

Electrolyte

As the electrolyte or the electrolyte solution which is a non-aqueous electrolyte solution (non-aqueous organic solvent), carbonate, ester, ether, or ketone may be used singly or in combination of two or more thereof, but is not limited thereto. For example, an aprotic organic solvent, such as dimethyl carbonate, diethyl carbonate, dipropyl carbonate, methyl propyl carbonate, ethyl propyl carbonate, methyl ethyl carbonate, ethylene carbonate, propylene carbonate, butylene carbonate, γ-butyrolactone, n-methyl acetate, n-ethyl acetate, n-propyl acetate, phosphoric acid triester, dibutyl ether, N-methyl-2-pyrrolidinone, 1,2-dimethoxyethane, tetrahydrofuran, tetrahydrofuran derivatives such as 2-methyltetrahydrofuran, dimethyl sulfoxide, formamide, dimethylformamide, dioxolane and derivatives thereof, acetonitrile, nitromethane, methyl formate, methyl acetate, trimethoxymethane, sulfolane, methyl sulfolane, 1,3-dimethyl-2-imidazolidinone, methyl propionate, ethyl propionate and the like can be used, but is not limited thereto.

Lithium salts may be added to the electrolyte solution (so-called non-aqueous electrolyte solution containing lithium salt). The lithium salts may comprise, but not limited to, those known to be favorably soluble in non-aqueous electrolyte solutions, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_3$(CF$_2$CF$_3$)$_3$, LiAlCl$_4$, CH$_3$SO$_3$Li, CF$_3$SO$_3$Li, (CF$_3$SO$_2$)$_2$NLi, lithium chloroborane, lithium lower aliphatic carboxylate, lithium tetraphenyl borate, or imide, etc. The (non-aqueous) electrolyte solution may further comprise pyridine, triethylphosphite, triethanolamine, cyclic ether, ethylene diamine, n-glyme, hexamethyl phosphoric triamide, nitrobenzene derivatives, sulfur, quinoneimine dyes, N-substituted oxazolidinone, N,N-substituted imidazolidine, ethylene glycol dialkyl ether, ammonium salt, pyrrole, 2-methoxy ethanol, aluminum trichloride or the like, for the purpose of improving charging-discharging characteristics, flame retardancy, and the like. If necessary, halogen-containing solvents such as carbon tetrachloride and ethylene trifluoride may be further added to impart nonflammability, and carbon dioxide gas may be further added to improve the high-temperature conservation characteristics.

Meanwhile, the lithium secondary battery of the present invention can be manufactured by a conventional method in the art. For example, the lithium secondary battery can be manufactured by inserting the porous separator between the positive electrode and the negative electrode, and introducing the non-aqueous electrolyte solution. The lithium secondary battery according to the present invention is not only applicable to a battery cell such as a coin cell used as a power source of a small device but also particularly suitably usable as a unit cell of a battery module which is a power source of a medium and large-sized device. In this respect, the present invention also provides a battery module in which at least two lithium secondary batteries are electrically connected (in series or in parallel). It is needless to say that the number of lithium secondary batteries comprised in the battery module may be variously adjusted in consideration of the use and capacity of the battery module.

In addition, the present invention provides a battery pack in which the battery modules are electrically connected according to a conventional technique in the art. The battery module and the battery pack may be used as a power source for at least one medium and large-sized device selected from power tools; electric cars comprising an electric vehicle (EV), a hybrid electric vehicle (HEV), and a plug-in hybrid electric vehicle (PHEV); electric trucks; electric commercial vehicles; or power storage systems, but the present invention is not limited thereto.

Hereinafter, preferred examples are presented in order to facilitate understanding of the present invention. However, it will be apparent to those skilled in the art that these examples are merely illustrative of the invention, various changes and modifications can be made within the scope and spirit of the invention, and such changes and modifications are intended to fall within the scope of the appended claims.

Manufacturing Example: Manufacturing of Lithium Secondary Battery Using Vanadium as Positive Electrode First, the positive electrode material (vanadium (V$_2$O$_5$)), an electrically conductive material (super-c), and a binder (PVDF) were mixed in a weight ratio of 8:1:1 to prepare a positive electrode. The prepared positive electrode was positioned to face a negative electrode (Li metal foil), and then a polyethylene separator was interposed therebetween. Subsequently, an electrolytic solution in which LiFSI was dissolved in a dimethyl ether (DME) solvent at a concentration of 4 M was injected to manufacture a lithium secondary battery (coin cell) in the form of a half cell.

Example 1: Charging/Discharging of Lithium Secondary Battery Using Electrochemical Pretreatment First, after confirming the reduction peak of the lithium secondary battery manufactured in the above manufacturing example at a scan rate of 5 mV/s and 1.0-4.0 V through a cyclic voltammetry, the onset potential value (1.9 V) was obtained. Subsequently, the lithium free vanadium positive electrode was instantaneously discharged at a rate of 0.1 C up to 2.0 V, exceeding the above onset potential value, and an electrochemical pretreatment (preconditioning) process was performed in which the discharged vanadium positive electrode was maintained at the onset potential value (1.9 V) for 30 seconds through a potentiostat (VMP-300, Biologic). Finally, the charging/discharging of the pretreatment vanadium positive electrode was carried out for 50 cycles at a rate of 0.5 C and 2.1-4.0 V using a charging/discharging apparatus (PEBC050.1, PNE solution) (all of the charging/discharging apparatuses used below are the same).

Example 2: Charging/Discharging of Lithium Secondary Battery Using Electrochemical Pretreatment The same procedure as in Example 1 was carried out, except that the maximum current value (1.6 V) is derived instead of the onset potential value through the reduction peak and the maximum current value (1.6 V) is maintained during electrochemical pretreatment. Meanwhile, FIG. 1 is a graph showing a state of a reduction peak that can be confirmed by a cyclic voltammetry according to an embodiment of the present invention, wherein the range of 2.1-4.0 V means the normal charging/discharging range, and the reduction peak can be confirmed at the point (1.6 V and 1.9 V) out of the normal charging/discharging range.

Comparative Example 1: Charging/Discharging of Conventional Lithium Secondary Battery After two cycles (formation cycles) of the charging/discharging of the vanadium positive electrode for the lithium secondary battery prepared in the above manufacturing example at a rate of 0.1 C and 2.1-4.0 V using a charger and a discharger, the charging/discharging was carried out at a rate of 0.5 C and for 50 cycles at 2.1-4.0 V.

Comparative Example 2: Charging/Discharging of Conventional Lithium Secondary Battery The charging/discharging was performed in the same manner as in Comparative Example 1, except that the voltage of the formation cycles was changed to 1.9 to 4.0 V instead of 2.1 to 4.0 V.

Comparative Example 3: Charging/Discharging of Conventional Lithium Secondary Battery The charging/discharging was performed in the same manner as in Comparative Example 1, except that the voltage of the formation cycles was changed to 1.6 to 4.0 V instead of 2.1 to 4.0 V.

Experimental Example 1: Evaluation of Phase of Vanadium Positive Electrode

The phases of the vanadium positive electrodes of the lithium secondary batteries charged/discharged in Examples 1 and 2 and Comparative Examples 1 to 3 were evaluated. FIG. 2 is a schematic diagram showing phases of the vanadium positive electrodes for the lithium secondary batteries charged/discharged in Examples according to the present invention and Comparative Examples, wherein (a) in FIG. 2 corresponds to Examples 1 and 2, (b) in FIG. 2 corresponds to Comparative Example 1, and (c) in FIG. 2 corresponds to Comparative Examples 2 and 3.

As shown in (a) in FIG. 2, it was confirmed that in the case of the phases of the vanadium positive electrode of the lithium secondary battery charged/discharged by using the pretreatment according to the present invention, the surface is only changed into irreversible omega (ω) phase, and the inside is maintained in reversible alpha (α), epsilon (ε), delta (δ), and gamma (γ) phases. On the contrary, in the case of Comparative Example 1 shown in (b) of FIG. 2, both the surface and the inside were in reversible alpha (α), epsilon (ε), delta (δ), and gamma (γ) phases during the charging/discharging, and in the case of Comparative Examples 2 and 3 shown in (c) of FIG. 2, both the surface and the inside were changed into an irreversible omega (ω) phase when charging/discharging, which prevented further charging/discharging.

Experimental Example 2: Performance Evaluation of Lithium Secondary Battery

Figure 3:
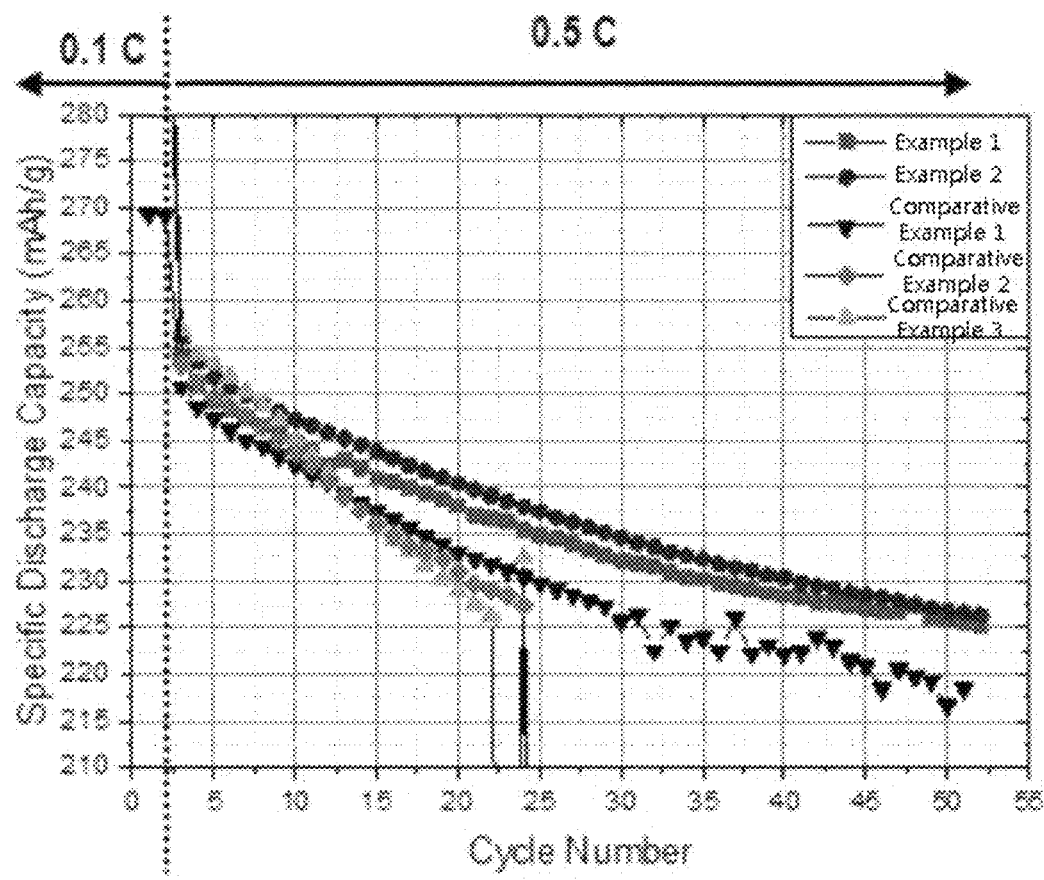
FIG. 3 is a graph for evaluating lifetime characteristics of the lithium secondary batteries charged/discharged in Examples according to the present invention and Comparative Examples.
Figure 4:
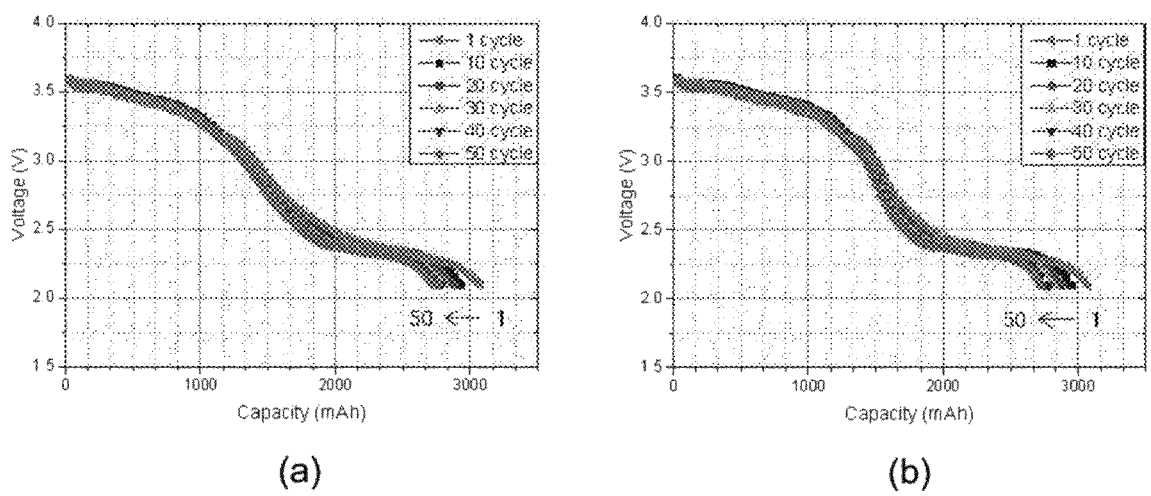
FIG. 4 is a voltage-capacity graph for evaluating the lifetime characteristics of the lithium secondary batteries according to Examples of the present invention.
Figure 5:
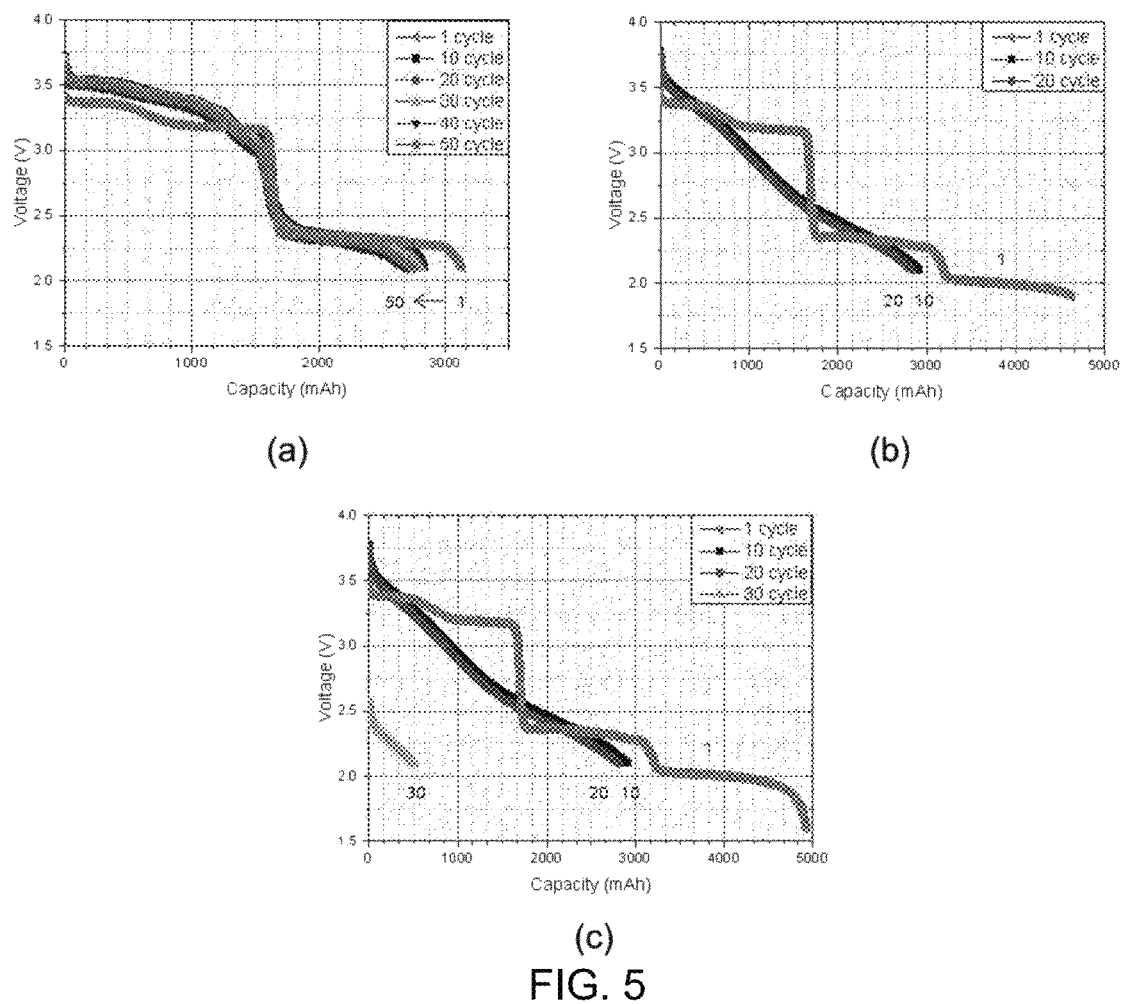
FIG. 5 is a voltage-capacity graph for evaluating the lifetime characteristics of the lithium secondary batteries according to Comparative Examples.

The lifetime characteristics of the lithium secondary batteries charged/discharged in Examples 1 and 2 and Comparative Examples 1 to 3 were evaluated. FIG. 3 is a graph for evaluating lifetime characteristics of the lithium secondary batteries charged/discharged in Examples according to the present invention and Comparative Examples, FIG. 4 is a voltage-capacity graph for evaluating the lifetime characteristics of the lithium secondary batteries according to Examples of the present invention, and FIG. 5 is a voltage-capacity graph for evaluating the lifetime characteristics of the lithium secondary batteries according to Comparative Examples. Meanwhile, (a) of FIG. 4 corresponds to Example 1, (b) of FIG. 4 corresponds to Example 2, and (a) to (c) of FIG. 5 correspond to Comparative Examples 1 to 3 sequentially.

As shown in FIG. 3, the lithium secondary batteries of Examples 1 and 2 exhibited excellent lifetime characteristics as compared to the lithium secondary battery of Comparative Example 1, and Example 2 among Examples showed particularly good lifetime characteristic. This is because only the surface of the vanadium positive electrode was changed into a stable omega (ω) phase and it is present along with alpha (α), epsilon (ε), delta (δ), and gamma (γ) phases during the successive charging/discharging (confirmed through comparison of FIG. 4 and FIG. 5). In this case, it can be seen that the leaching of vanadium is inhibited and thus the lifetime characteristics of the positive electrode and the battery are improved.

On the other hand, it can be confirmed that in the case of the lithium secondary batteries of Comparative Examples 2 and 3, both the surface and inside of the vanadium positive electrode were changed into a stable omega (ω) phase during the initial discharging process, and then did not return to alpha (α), epsilon (ε), delta (δ), and gamma (γ) phases during the continuous charging/discharging process, thereby being degenerated before 30 cycles. It can be judged that this can be attributed to the fact that both the surface and the inside of the vanadium positive electrode were changed into a stable omega (ω) phase.

The invention claimed is:

1. An electrochemical pretreatment method of a vanadium positive electrode for a lithium secondary battery, comprising:
   a) a step of discharging a lithium-free vanadium positive electrode at a voltage of 1.9 V or more to obtain a discharged vanadium positive electrode;
   b) an electrochemical pretreatment step of maintaining the discharged vanadium positive electrode of a) at an onset potential value through a potentiostat, or a potential value having a maximum current through a potentiostat to obtain a pretreated vanadium positive electrode; and
   c) a step of charging and discharging the pretreated vanadium positive electrode of b) at a voltage range of 2.1 V to 4.0 V to obtain the vanadium positive electrode for the lithium secondary battery,
   wherein the onset potential value and the potential value having the maximum current are derived by confirming a reduction peak of the lithium secondary battery using vanadium oxide as a positive electrode through a cyclic voltammetry, and
   wherein the electrochemical pretreatment step is performed for 5 seconds to 60 seconds, and
   wherein the surface of the vanadium positive electrode for the lithium secondary battery is in an omega (ω) phase and the inside of the vanadium positive electrode for the lithium secondary battery is in any one selected from the group consisting of alpha (α) phase, epsilon (ε) phase, delta (δ) phase, and gamma (γ) phase.

2. The electrochemical pretreatment method of the vanadium positive electrode for the lithium secondary battery according to claim 1, wherein the reduction peak is confirmed by performing a cyclic voltammetry at a voltage of 1.0 V to 4.0 V and a scan rate of 1 mV/s to 10 mV/s.

3. The electrochemical pretreatment method of the vanadium positive electrode for the lithium secondary battery according to claim 1, wherein the vanadium oxide is represented by the following Formula 1:

$$V_aO_b,  \quad \text{[Formula 1]}$$

wherein $1 \leq a \leq 6$ and $2 \leq b \leq 13$.

4. The electrochemical pretreatment method of the vanadium positive electrode for the lithium secondary battery according to claim 1, wherein the vanadium oxide is vanadium pentoxide ($V_2O_5$).

5. A vanadium positive electrode for a lithium secondary battery, obtained with the electrochemical pretreatment method of claim 1, which has a surface of a stable irreversible state and an inside of a reversible state.

* * * * *